United States Patent [19]
Ricci

[11] Patent Number: 5,660,093
[45] Date of Patent: Aug. 26, 1997

[54] PORTABLE JOURNAL TURNING LATHE

[76] Inventor: Donato L. Ricci, W8477—162nd Ave., Hager City, Wis. 54014

[21] Appl. No.: 589,407

[22] Filed: Jan. 22, 1996

[51] Int. Cl.$^6$ ........................................... B23B 5/14
[52] U.S. Cl. ................................. 82/113; 82/128
[58] Field of Search ............................. 82/113, 128

[56] References Cited

U.S. PATENT DOCUMENTS

| | | |
|---|---|---|
| 2,796,792 | 6/1957 | Dias . |
| 4,359,917 | 11/1982 | Wilger et al. . |
| 4,739,685 | 4/1988 | Ricci ........................................ 82/113 |
| 4,799,409 | 1/1989 | Ricci . |
| 4,922,772 | 5/1990 | Silk ......................................... 82/113 |
| 4,939,964 | 7/1990 | Ricci ........................................ 82/113 |
| 4,944,205 | 7/1990 | Ricci ........................................ 82/113 |
| 5,189,933 | 3/1993 | Ricci ........................................ 82/113 |

*Primary Examiner*—Daniel W. Howell
*Assistant Examiner*—Kenneth J. Hansen
*Attorney, Agent, or Firm*—Haugen and Nikolai, P.A.

[57] ABSTRACT

A journal turning lathe comprises a pair of split clam shell assemblies that are held in parallel, spaced relationship by a plurality of spacer rods, two of which support a tool carrier assembly for axial movement relative to a shaft to be turned by the lathe. The tool carrier assembly includes at least one, but preferably two, cutting tool advancing mechanisms for controlling the radial position of the cutting tool(s) and, hence, the dept-of-cut. The tool carrier assembly is arranged to be reciprocally driven in the axial direction by a threaded lead screw driven by a star wheel which rotates through a predetermined angle upon each full rotation of the clam shell's movable ring member. The lead screw cooperates with a quick-release nut in the tool carrier assembly.

3 Claims, 5 Drawing Sheets

PORTABLE JOURNAL TURNING LATHE

BACKGROUND OF THE INVENTION

I. Field of the Invention

This invention relates generally to apparatus for repairing and refurbishing the bearing surfaces of rotating shafts of large machines at a job site, and more particularly to a portable journal turning lathe that can be readily transported to a location in the field where a machine to be repaired is located, assembled in place on the machine's shaft to be turned, and then operated to remove any scoring and other surface irregularities from the shaft so that it is ready for replacement of its bearings.

II. Discussion of the Prior Art

In the past, when it has become necessary to refurbish the journal area on a shaft of large machines such as rock crushers, ship's rudders, etc., it has been necessary to tear down the machine and ship the assembly, including the shaft, to a machine shop where it may be turned on an engine lathe typically weighing 90 tons or more. This necessarily increases the down time of the machine being refurbished. Thus, a need exists for a portable journal turning lathe that can be taken to the job site in easily transportable parts and then assembled onto a shaft to be turned, quickly and easily. Such a lathe must still provide close tolerance machining of a shaft, equivalent to that which can be obtained using a conventional engine lathe.

In my earlier U.S. Pat. No. 4,739,685, I describe a split frame portable machining lathe comprising a clam shell member having a stationary clamping ring adapted for concentric mounting on a pipe to be machined and a rotatable ring gear journaled for rotation on the stationary clamping ring. Affixed to the rotatable ring gear is a cutting tool feed mechanism which can be used to advance a cutting tool in the radial direction to thereby control the depth of cut as the cutting tool carried by the feed mechanism moves in an orbital path about the pipe or shaft being turned.

The device disclosed in my U.S. Pat. No. 4,739,685 is intended primarily for accurately cutting off the end of a pipe in that there is no provision for longitudinal displacement of the cutting tool holder. In another of my earlier patents U.S. Pat. No. 5,189,933, I have disclosed yet another machine for treating the end portion of a pipe. Again, a clam shell mechanism is employed for supporting a tool carrier and rotating same about the periphery of the pipe on which the clam shell member is assembled. The tool carrier provides for only limited longitudinal or axial displacement of the tool bit along with radial displacement, but has been found that the device of the '933 patent cannot maintain accurate tolerances over much more than about 2-3 inches in the axial direction.

Therefore, a need exists for a journal turning lathe that can be readily transported in a disassembled state to a job site and then assembled onto the shaft to be turned quickly and easily and which can accurately maintain a predetermined tolerance of $5/10000$ of an inch or better over an axial length from a few inches up to two feet or more.

SUMMARY OF THE INVENTION

The foregoing advantages are achieved in accordance with the present invention by providing a portable lathe for turning a shaft that comprises first and second clam shell assemblies that are adapted to be concentrically mounted on the shaft to be turned in a parallel, spaced-apart relation. Each such clam shell assembly includes a stationary ring member adapted to be clamped to the shaft to be worked and a movable ring member journaled for rotation on the stationary ring member. First and second guide rods extend between the movable ring members of the first and second clam shell assemblies in parallel, spaced-apart relationship to one another. A slide member is mounted on the first and second guide rods for longitudinal travel therealong. A cutting tool carrier is mounted on the slide member and is used to support a cutting tool. More particularly, the cutting tool carrier includes a micrometer-type movement for adjusting the radial displacement of a cutting tool relative to the shaft to be turned. A motor is provided for driving the movable ring member on one of the first and second clam shell assemblies to cause the movable ring member of the slave clam shell, the guide rods and the cutting tool carrier and cutting tool to move in an orbital path about the shaft to be turned. In addition, means are provided for incrementally, longitudinally displacing the slide member along the first and second guide rods upon each full orbit of the tool carrier. In this fashion, the area on the shaft to be turned spanned between the two clam shell assemblies is turned with the depth-of-cut being adjusted by a machinist using the micrometer adjustment on the tool carrier.

In that the clam shell members are constructed in semi-circular segments, they are sufficiently light that one man can carry them and assemble them together about the shaft to be turned. The guide rods and the journal blocks used to mount the guide rods on to the moveable ring of the clamshell is also sufficiently low weight that they can be mounted between the spaced-apart clam shell assemblies so as to allow a single individual to assemble the portable journal turning lathe about the shaft to be processed.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 1:
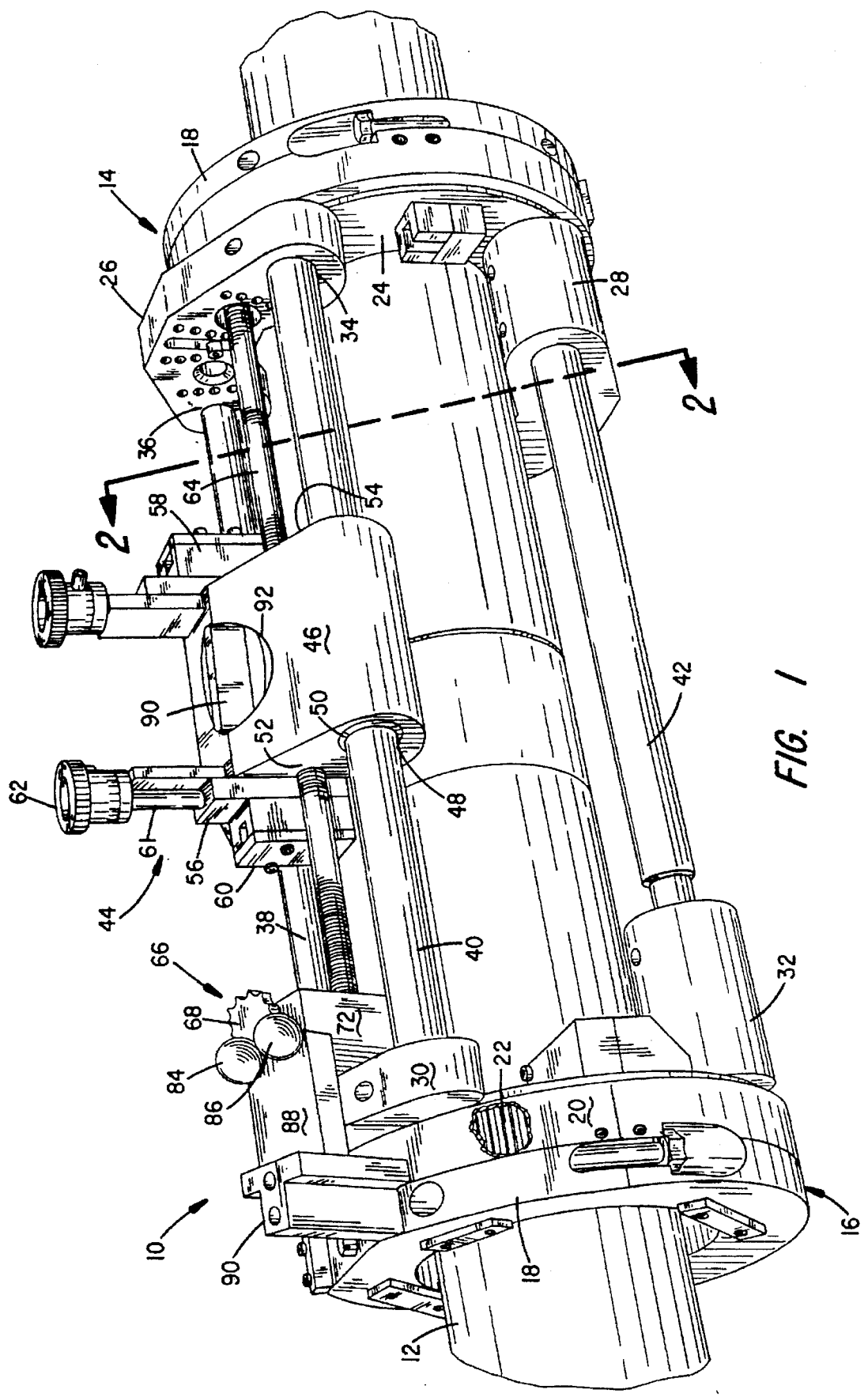
FIG. 1 is a perspective view of the portable journal turning lathe of the present invention.
Figure 2:
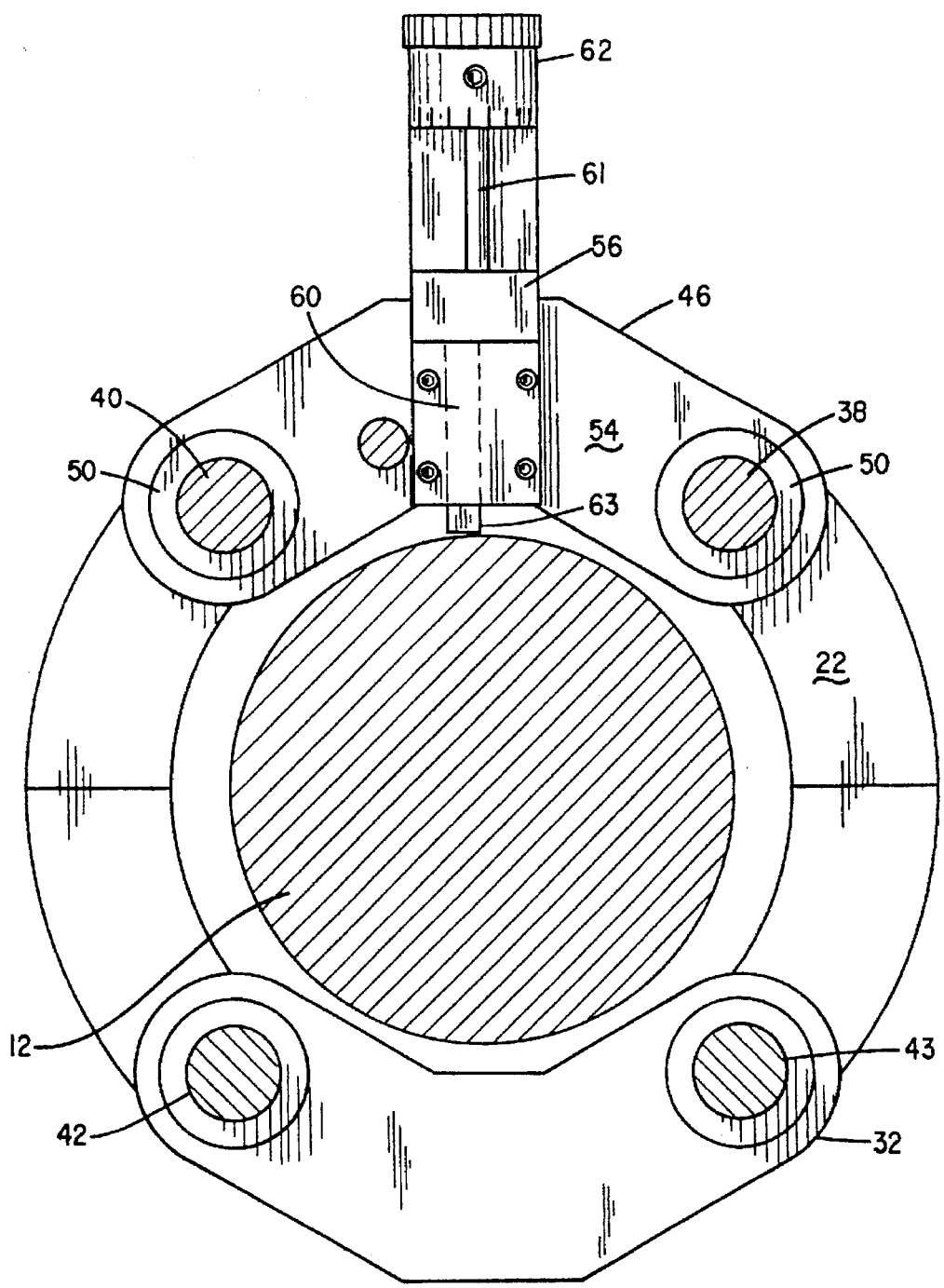
FIG. 2 is a cross-sectional view taken along the line 2—2 in FIG. 1.

Referring first to FIG. 1, there is indicated generally by numeral 10 the portable journal turning lathe of the present invention. It is illustrated mounted on a shaft 12, whose surface is in need of refurbishing because of uneven wear or scoring which, for example, may have been caused by a failed journal bearing.. The journal turning lathe is seen to comprise first and second split frame clam shell assemblies 14 and 16, which may be of the type more particularly described in my earlier U.S. Patent 4,739,685, the teachings of which are hereby incorporated by reference as if set forth in full herein. As is explained in the '685. patent, each of the split frame clam shell assemblies includes a stationary ring 18 adapted to be securely and concentrically clamped onto the shaft 12 to be turned. Disposed beneath a protective shroud 20 and journaled for rotation on bearings (not shown) extending in the axial direction from the flat side surface of the stationary clamping ring 18 is a movable gear ring 22. The movable gear ring 22 of one of the clam shell assemblies 14 and 16 is adapted to be driven by a suitable motor (not shown) such as a pneumatic, hydraulic or electric motor. The manner in which a motor ms configured to drive the rotatable ring gear 22 of a clam shell assembly is fully disclosed in the '685 patent and need not be repeated here.

Bolted or otherwise affixed to the flat, inward facing side surface 24 of the movable ring gear member 22 on clam shell assembly 14 are first and second stabilizer brackets 26 and 28. Likewise, stabilizer brackets 30 and 32 are appropriately bolted to the flat, inward facing side surfaces of the ring gear 22 Of clam shell assembly 16. Fitted into axially extending bores 34 and 36 in stabilizer bracket 26 and into corresponding bores formed in the stabilizer bracket 30 are first and second parallel, spaced-apart guide rods 38 and 40. Likewise, a pair of spacer rods, only one of which is visible in the view of FIG. 1, extend between stabilizer brackets 28 and 32. The rods as at 42 along with the stabilizer brackets 28 and 32 not only function to maintain rigidity between the clam shell assemblies 14 and 16, but also function as a counterweight for the stabilizer brackets 26 and 30 and the guide rods 38 and 40, as well as for the mass of the tool carrier assembly 44 yet to be described. By providing this counterweight, smoother, more balanced rotation of the rotatable gear members occurs without backlash.

The tool carrier assembly 44 includes a tool slide block 46 having first and second parallel bores, as at 48 formed-longitudinally therethrough. Sleeve bearings 50 are included within the bores 48 and receive the guide rods 38 and 40 therein. Thus, the tool slide block 46 is able to slide reciprocally along the guide rods. Bolted to the opposed side surfaces 52 and 54 of the tool slide block 46 are first and second cutting tool carriers 56 and 58, respectively. The tool carriers are identical and include a tool block 60 having a dove-tail shaped projection (not shown) mating with a dove-tail groove in the block 56. Cooperating with tool block 60 is a finely threaded shaft 61 adapted to be turned by a micrometer knob 62 whereby the tool block 60 can be made to move up and down in the radial direction upon clockwise or counterclockwise rotation of the micrometer knob 62. Suitable indicia or scale markings are provided on the micrometer knob so that, knowing the thread pitch on the screw 61, the tool block including the tool bit 63 which it holds can be precisely positioned along a radial axis, thereby controlling the depth of cut.

Figure 3:
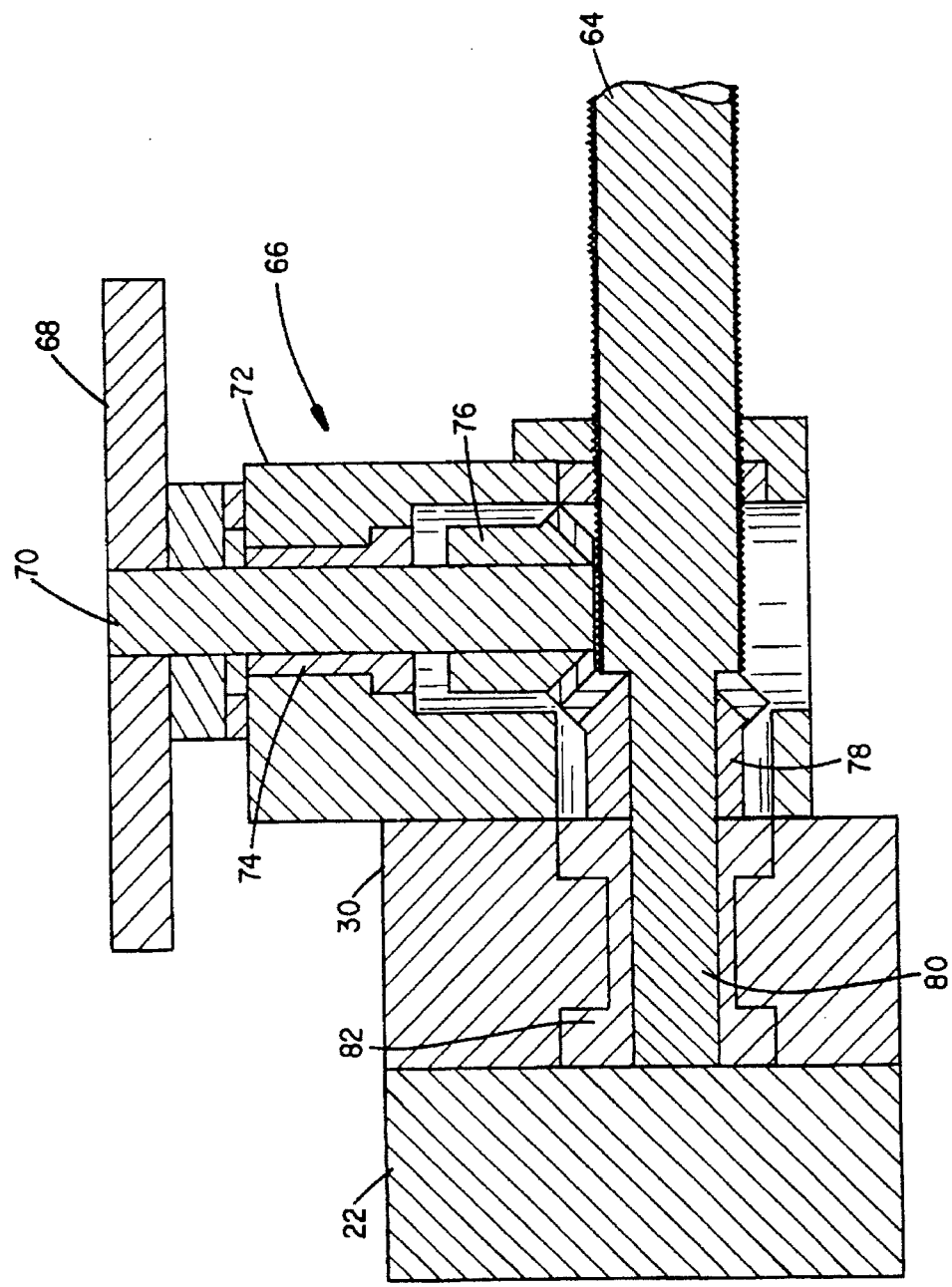
FIG. 3 is a partial sectioned view showing the lead screw drive mechanism.

Means are provided for incrementally displacing the tool slide block 46 in the axial or longitudinal direction along the first and second guide rods 38 and 40 upon each full rotation of the movable ring member 22. More specifically, journaled for rotation in the stabilizer bracket 26 and extending through a cylindrical bore centrally disposed and passing through the tool slide block 46 is a threaded lead screw 64 which, as can best be seen from the cross-sectional view of FIG. 3, is adapted to be driven by a star-wheel mechanism 66. The star-wheel mechanism, like that depicted in my '685 patent, includes a star-wheel 68 affixed to a shaft 70 which is journaled for rotation in a gear housing 72 by means of a sleeve bearing 74. Affixed to the lower end of the shaft 70 is a bevel gear 76 which is arranged to mesh with a driven bevel gear 78 that is keyed to an unthreaded portion 80 of the lead screw 64. The unthreaded portion 80 of the lead screw 64 is journaled for rotation in a bearing 82 contained within the stabilizer bracket 30. As already mentioned, the stabilizer bracket 30 is adapted to be bolted to a flat side surface of the movable ring gear 22.

Referring again to FIG. 1, the star wheel 68 is arranged to cooperate with one or the other of first and second directional control pins on which manual gripping knobs 84 and 86 are attached. The pins affixed to the gripping knobs 84 and 86 are not shown in the drawings but they extend through a bridge plate 88 affixed by mounting block 90 to the stationary ring member 18. The pins (not shown) are appropriately notched so that when elevated, the teeth on the star wheel 68 do not engage the pin. However, when one or the other of the pins is in its lowermost disposition, the teeth of the star wheel will engage that pin once each revolution of the movable ring members to rotate the threaded lead screw 64 a small incremental amount.

Figure 4:
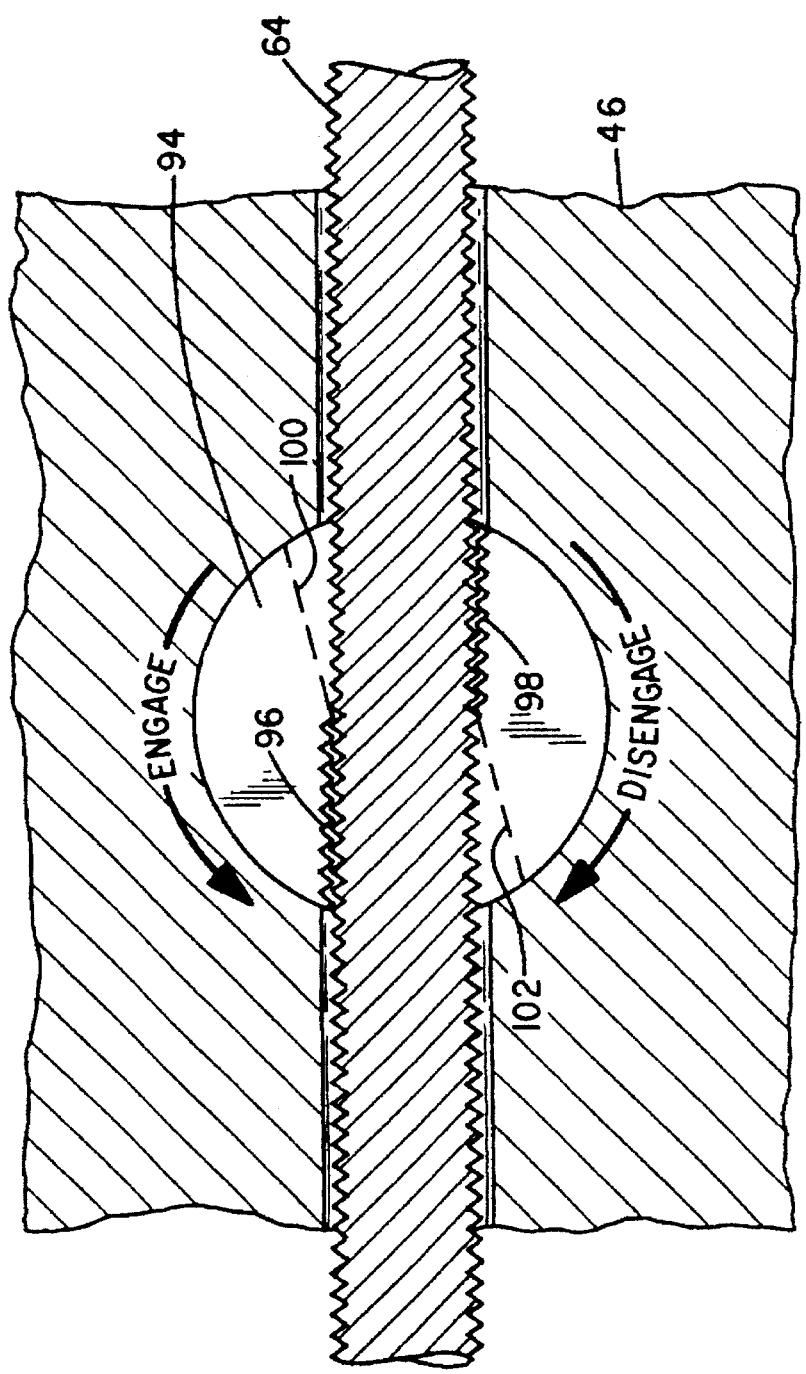
FIG. 4 is a horizontal sectional view taken through the tool carrier to illustrate the quick acting feed nut mechanism.
Figure 5:
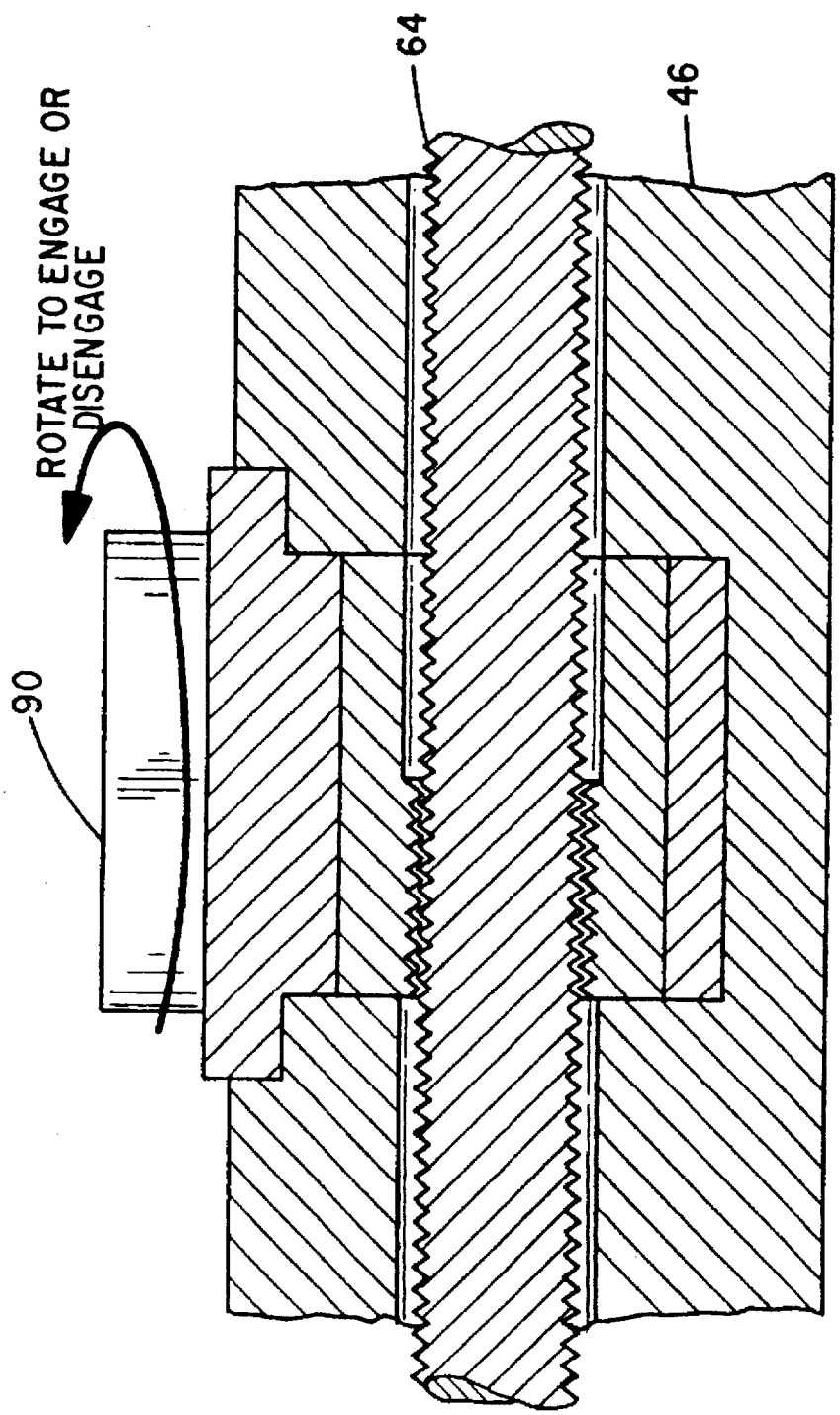
FIG. 5 is a front sectional view taken through the slide carrier and further illustrating the quick acting feed nut mechanism.

The rotational movement of the lead screw 64 will cause an axial displacement of the tool carrier assembly 44, provided a quick-acting feed nut contained within the tool block assembly 46 is in a position to engage the threads on the lead screw 64. Visible in the view of FIG. 1 is a bar-shaped handle 90 that is recessed in a circular bore 92 of the tool slide block 46. As is shown in FIG. 5, the handle 90 may be used to rotate a feed nut 94. The feed nut has a pair of intersecting bores through which the lead screw 64 may pass and only selective portions of the two intersecting bores are threaded to match the thread pattern on the lead screw. As best seen in FIG. 4, when the handle 90 is rotated to turn the quick-acting feed nut in the counterclockwise direction, the threaded areas 96 and 98 mesh with the threads on the lead screw. However, when the handle 90 is rotated in the clockwise direction, the unthreaded portions 100 and 102 abut the lead screw while the threaded portions 96 and 98 no longer engage it. This mechanism allows the operator to manually shift the position of the tool slide 46 along the guide rods 38 and 40 by simply turning the handle 90 in the clockwise direction. When an initial position for the tool slide 46 is set, the operator rotates the quick-acting feed nut handle 90 in the counterclockwise direction such that the threaded zones 96 and 98 engage the lead screw, only allowing translation of the tool slide by rotation of the lead screw each time the star wheel engages its mating pins.

OPERATION

Having described the mechanical configuration of the portable journal turning lathe of the present invention, consideration will next be given to its mode of operation.

The workmen will arrive at the job site with the journal turning lathe assembly disassembled into several subassemblies, each of sufficiently lightweight that one individual can readily lift and position the components/subassemblies when mounting the journal turning lathe on the shaft to be worked. Thus, for example, each of the clam shell members 14 and 16 will be split into semi-circular or even quarter sections which, when clamped together, will totally encircle the shaft 12. Next, a pre-assembled subassembly including stabilizer brackets 26 and 30, slide rods 38 and 40 and the tool slide block 46 can be bolted to the flat face of the movable ring member 24 of the clam shell assembly 14 and to that of clam shell gear ring. 20. Likewise, the counterweight subassembly, including the spacer rods 42 and the stabilizer brackets 28 and 32 are bolted in place.

Once the various subassemblies are assembled onto the shaft to be turned as illustrated in FIG. 1, the stationary members 18 of the clamshell assemblies 14 and 16 will be positioned and adjusted so that they are coaxially disposed with the axis of the shaft 12.

The machinist will then adjust the position of the tool carrier assembly 44 to a desired location along the guide rods 38 and 40 using the quick-acting feed nut mechanism in its non-engaged state. Once the starting point for the cut is set, the handle 90 will be rotated so as to cause the threads on the quick-acting feed nut to engage those on the lead screw 64. Next, the machinist will adjust the depth-of-cut of the cutting tools 63 using the micrometer positioning mechanism including the scaled knobs 62 for rotating the threaded rods 61 to effect accurate displacement of the tool holder 60.

The drive motor (not shown) meshed to the movable ring gear 22 will then be turned on to rotate the ring gear as well as the stabilizer brackets 26 and 30, the guide rods 38 and 40 and the tool carrier assembly 44 mounted thereon. Diametrically disposed relative to the foregoing assembly is the counterweight assembly including brackets 28 and 32 and the spacer rods 42. Each rotation will cause the tool bit 63 to remove a layer of metal from the shaft 12. Also, on each revolution of the assembly, the star wheel 68 will be made to engage the shaft of a pin passing through the stationary bridge plate 88 causing the star wheel to rotate through a predetermined angle determined by the number of teeth on the star wheel.

With reference to FIG. 3, rotation of the star wheel 68 will also rotate the mating bevel gears 76 and 78 to thereby rotate the lead screw, thus advancing the tool slide assembly 44 in a first or a second axial direction as determined by the setting of the pins associated with the control knobs 84 and 86.

By providing a pair to tool slide blocks on opposite faces of the tool slide 46, it is possible to span substantially the entire distance between the stabilizer brackets 26–28 and 30–32. Following a full traversal of the tool carrier assembly 44 across the length of the shaft to be machined, the operator will again set the depth of cut using the micrometer knobs 62 prior to the tool slide making another pass under control of the star-wheel driven lead screw 64.

With no limitation intended, the lead screw may have a thread that is ¾×10 and with a star wheel having 12 teeth, the tool slide assembly 44 will be moved approximately 0.007 inches per revolution. By using Type 4140 alloy steel for the guide rods 38 and 40 and for the spacer rods 42, it has been found possible to maintain round tolerances of 0.0005 inches over a stroke length of 24 inches. Where it is desired to turn the shaft over a length greater than 24 inches, it is a simple matter to merely release the clamping forces between the stationary ring members 16 and 18 on the shaft 12 and reposition the assembly so that one end will overlap a previously turned portion of the shaft and then retightening the clamping shims.

While FIG. 1 illustrates the journal turning lathe of the present invention being used to turn a cylindrical shaft, by providing clam shell assemblies of differing diameter or by appropriately using spacer shims with one of the Clam shells, the journal turning lathe of the present invention can be used to turn a tapered shaft just as easily as a cylindrical shaft.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A portable lathe for turning a shaft comprising, in combination:

(a) first and second clam shell assemblies adapted to be concentrically mounted on a shaft to be turned, each of said clam shell assemblies including a stationary ring member adapted to be clamped to the shaft at parallel, spaced-apart locations and a movable ring member journaled for rotation on the stationary ring member, the stationary and movable ring members each comprising two separable semicircular segments adapted to be joined together in surrounding relation to the shaft;

(b) first and second guide rods extending between the movable ring members of the first and second clam shell assemblies in parallel spaced apart relationship to one another;

(c) a slide member mounted on the first and second guide rods for longitudinal travel therealong;

(d) a cutting tool carrier mounted on the slide member for supporting a cutting tool, said cutting tool carrier including means for adjusting a radial displacement of the cutting tool relative to the shaft to be turned; and (e) bidirectional drive means for automatically incrementally, longitudinally displacing the slide member along the first and second guide rods upon each rotation of said movable ring members, said bidirectional drive means comprising (i) a threaded lead screw having opposed ends journaled for rotation in bearing block members affixed to the movable ring;

(ii) a slide nut manually rotatably disposed in the slide member for selective engagement and disengagement with the threaded lead screw for allowing manual or automatic displacement of the slide member along the threshold lead screw; and (iii) a star wheel coupled to driving relation to the lead screw and adapted for selective engagement with a first or a second stationary pin during each rotation of the movable ring member to effect clockwise or counterclockwise rotation of the lead screw, respectively.

2. The portable lathe as in claim 1 and further including a counter weight assembly attached between the movable ring members of the first and second clam shell assemblies.

3. The portable lathe as in claim 1 and further including a further cutting tool carrier mounted on the slide member, the further cutting tool carrier including means for adjusting a radial displacement of a cutting tool being carried by said further tool carrier relative to the shaft to be turned.

* * * * *